(12) United States Patent
Kasai

(10) Patent No.: US 11,486,197 B2
(45) Date of Patent: Nov. 1, 2022

(54) MOTOR UNIT AND DRIVE DEVICE

(71) Applicant: NIDEC SERVO CORPORATION, Kiryu (JP)

(72) Inventor: Shinya Kasai, Kiryu (JP)

(73) Assignee: NIDEC SERVO CORPORATION, Gunma (JP)

( * ) Notice: Subject to any disclaimer, the term of this patent is extended or adjusted under 35 U.S.C. 154(b) by 735 days.

(21) Appl. No.: 16/469,166

(22) PCT Filed: Jan. 17, 2018

(86) PCT No.: PCT/JP2018/001146
§ 371 (c)(1),
(2) Date: Jun. 13, 2019

(87) PCT Pub. No.: WO2018/135514
PCT Pub. Date: Jul. 26, 2018

(65) Prior Publication Data
US 2019/0352964 A1    Nov. 21, 2019

(30) Foreign Application Priority Data

Jan. 20, 2017  (JP) .............................. JP2017-008550

(51) Int. Cl.
*E06B 9/72* (2006.01)
*H02K 11/33* (2016.01)
(Continued)

(52) U.S. Cl.
CPC .............. *E06B 9/72* (2013.01); *H02K 5/225* (2013.01); *H02K 7/102* (2013.01); *H02K 7/116* (2013.01);
(Continued)

(58) Field of Classification Search
USPC ......................................................... 160/310
See application file for complete search history.

(56) References Cited

U.S. PATENT DOCUMENTS 6,099,325 A * 8/2000 Parkhill ................. H01R 13/52
439/76.1
9,598,901 B2 * 3/2017 Kirby .................... H02K 7/116
(Continued)

FOREIGN PATENT DOCUMENTS

CN          2218452 Y     1/1996
CN        101304205 A    11/2008
(Continued)

OTHER PUBLICATIONS

Official Communication issued in corresponding Chinese Patent Application No. 201880006957.3, dated Mar. 18, 2021.
(Continued)

*Primary Examiner* — Rodney E Fuller
(74) *Attorney, Agent, or Firm* — Keating & Bennett

(57) ABSTRACT

A motor assembly includes an output shaft disposed along a central axis extending in one direction, a motor that rotates the output shaft, a circuit board electrically connected to the motor, a power supply that supplies power to the motor and the circuit board, and a case having a tubular shape that extends in an axial direction and accommodates the motor, the circuit board, and the power supply. A substrate surface of the circuit board and the power supply are disposed to face each other in a predetermined direction that is orthogonal or substantially orthogonal to the axial direction.

10 Claims, 6 Drawing Sheets

(51) Int. Cl.
    *H02K 5/22*      (2006.01)
    *H02K 7/102*     (2006.01)
    *H02K 7/116*     (2006.01)
    G08C 17/02       (2006.01)
    H04B 1/40        (2015.01)

(52) U.S. Cl.
    CPC ............. *H02K 11/33* (2016.01); *G08C 17/02* (2013.01); *H02K 2207/03* (2013.01); *H02K 2211/03* (2013.01); *H04B 1/40* (2013.01)

(56) References Cited

U.S. PATENT DOCUMENTS

2005/0253478 A1  11/2005  Masuda et al.
2015/0075732 A1   3/2015  Kirby et al.

FOREIGN PATENT DOCUMENTS

| EP | 1 244 199 A1 | 9/2002 | |
| EP | 1244199 A1 * | 9/2002 | ............... E06B 9/72 |
| JP | 2005-328601 A | 11/2005 | |
| JP | 4060207 B2 | 3/2008 | |
| JP | 2013-172927 A | 9/2013 | |

OTHER PUBLICATIONS

Official Communication issued in International Patent Application No. PCT/JP2018/001146, dated Mar. 13, 2018.

\* cited by examiner

MOTOR UNIT AND DRIVE DEVICE

CROSS REFERENCE TO RELATED APPLICATIONS

This is the U.S. national stage of PCT Application No. PCT/JP2018/001146, filed on Jan. 17, 2018, and priority under 35 U.S.C. § 119(a) and 35 U.S.C. § 365(b) is claimed from Japanese Application No. 2017-008550, filed Jan. 20, 2017; the entire disclosures of which are incorporated herein by reference.

FIELD OF THE INVENTION

The present disclosure relates to a motor unit and a drive device.

BACKGROUND

Motor units have been known to have a tubular casing extending in one direction. For example, Japanese Patent No. 4060207 describes a motor unit for a shutter device as an example of such a motor unit. The motor unit of Japanese Patent No. 4060207 has a control board housed in a casing. In Japanese Patent No. 4060207, the control board is arranged in line with components of the motor unit inside the casing, which has a tubular shape, in an extending direction of the casing.

The control board as described above is enlarged so that many electronic components can be mounted thereon, for example, according to multifunctionalization of the motor unit, or the like. Here, in the case where the control board is arranged in line with the components of the motor unit in the extending direction of the casing as in Japanese Patent No. 4060207, the casing needs to be elongated in the extending direction according to the enlargement of the control board, which causes enlargement of the whole motor unit.

SUMMARY

Example embodiments of the present disclosure provide motor assemblies each including a circuit board and a structure capable of preventing enlargement of the motor assembly even when the circuit board is enlarged, and a drive device including such a motor assembly.

One example embodiment of a motor assembly of the present disclosure includes an output shaft disposed along a central axis extending in one direction, a motor that rotates the output shaft, a circuit board electrically connected to the motor, a power supply that supplies power to the motor and the circuit board, and a case having a tubular shape that extends in an axial direction and accommodates the motor, the circuit board, and the power supply. A substrate surface of the circuit board and the power supply are disposed to face each other in a predetermined direction that is orthogonal or substantially orthogonal to the axial direction.

One example embodiment of a drive device of the present disclosure includes the motor assembly described above, and a rotary cylinder having a cylindrical shape that extends in the axial direction and disposed radially outwardly from the case, and the rotary cylinder is connected to the output shaft and is rotated according to rotation of the output shaft.

One example embodiment of the present disclosure provides a motor assembly including a circuit board and a structure capable of preventing enlargement of the motor assembly even when the circuit board is increased in size, and a drive device including such a motor assembly.

The above and other elements, features, steps, characteristics and advantages of the present disclosure will become more apparent from the following detailed description of the example embodiments with reference to the attached drawings.

DETAILED DESCRIPTION

In the XYZ coordinate system shown in each figure, a Z-axis direction is a vertical direction. An X-axis direction and a Y-axis direction are horizontal directions orthogonal to the Z-axis direction, and are directions orthogonal to each other. In the following description, a direction parallel to the Z-axis direction is referred to as a "vertical direction Z", and a direction parallel to the Y-axis direction is referred to as a "front-rear direction Y". A positive side in the Z-axis direction is referred to as an "upper side", and a negative side in the Z-axis direction is referred to as a "lower side". A positive side in the Y-axis direction is referred to as a "rear side", and a negative side in the Y-axis direction is referred to as a "front side". In the present example embodiment, the vertical direction Z corresponds to a predetermined direction. The upper side corresponds to one side in the predetermined direction. The lower side corresponds to the other side in the predetermined direction. Note that the vertical direction, the front-rear direction, the upper side, and the lower side simply describe the relative position of each component, and the actual position or the like may include positions other than those indicated by these wordings.

Figure 1:
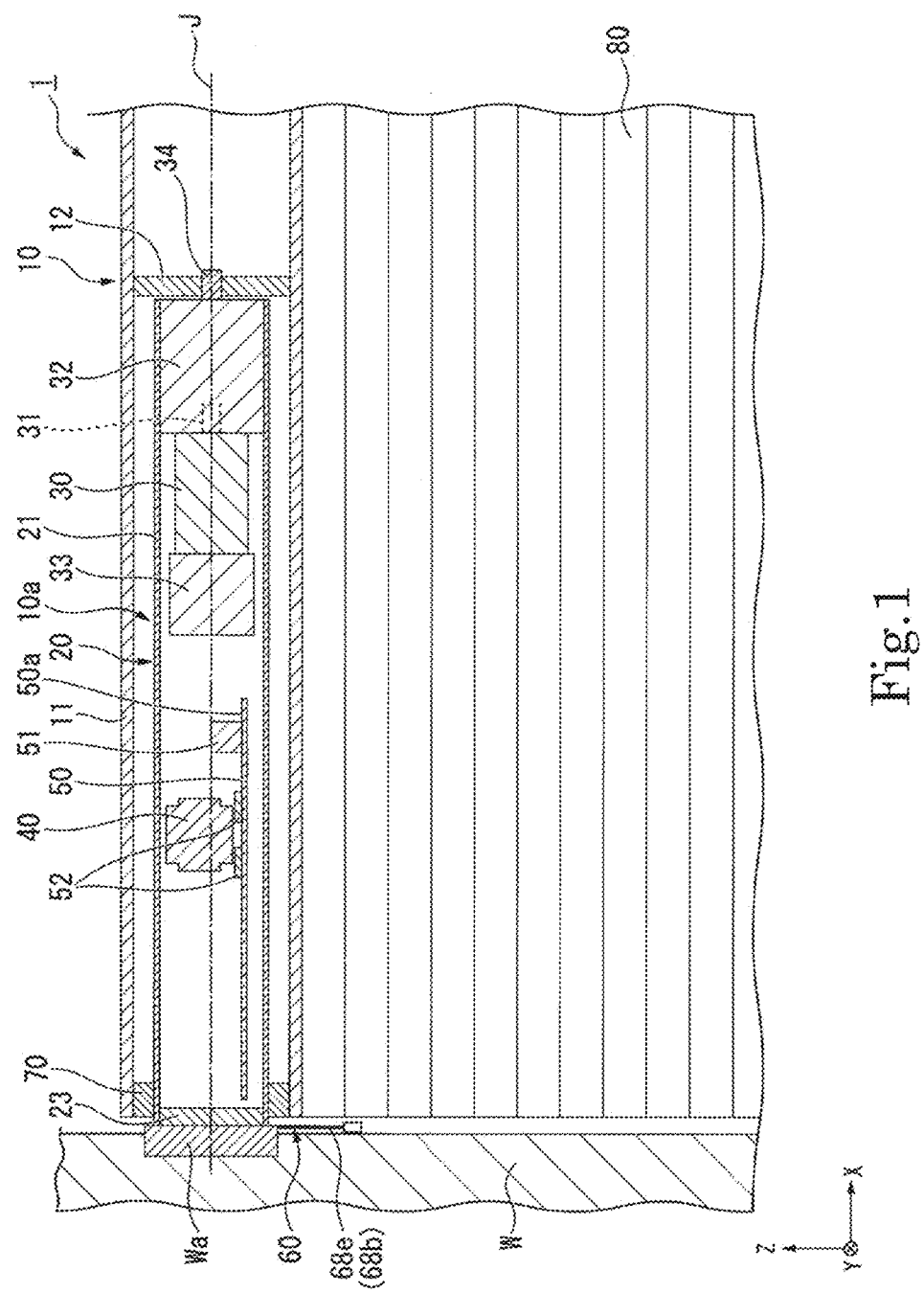
FIG. 1 is a front sectional view of a portion of a shutter device according to an example embodiment of the present disclosure.

As shown in FIG. 1, a drive device 10 of the present example embodiment is a drive device for a shutter device 1. The shutter device 1 includes a drive device 10 and a shutter 80 that is moved up and down by the drive device 10. The drive device 10 includes a motor assembly 10a, a rotary cylinder 11, a connection member 12, and a bearing 70.

The motor assembly 10a has a cylindrical shape extending in one direction as a whole. One end of the motor assembly 10a is fixed to a wall W through a fixing member Wa. The motor assembly 10a includes an output shaft 34, a case 20, a motor 30, a reduction gear 32, a brake device 33, a connection switching assembly 60, a circuit board 50, a plurality of electronic components 51, 52, and a power supply device 40.

The output shaft 34 is disposed along a central axis J extending in one direction. In the present example embodiment, the central axis J extends in a direction parallel to the X-axis direction among horizontal directions. In the following description, a direction parallel to the central axis J, that is, a direction parallel to the X-axis direction is referred to as an "axial direction X", a radial direction centering on the central axis J is simply referred to as a "radial direction", and a circumferential direction around the central axis J is simply referred to as a "circumferential direction". Further, in the description of arrangement of the components of the motor assembly 10*a*, an end where the motor assembly 10*a* is fixed to the wall W in the axial direction X, that is, the negative side in the X-axis direction is referred to as a "base end side", and an end opposite to the base end side, that is, the positive side in the X-axis direction is referred to as a "tip end side".

The case 20 extends in the axial direction X. As shown in FIGS. 1 to 4, the case 20 has a cylindrical shape centered on the central axis J in the present example embodiment. In the present specification, the description that the case has a cylindrical shape includes the structure that the case has a substantially cylindrical shape in addition to the structure that the case has an exact cylindrical shape. The structure that the case has a substantially cylindrical shape includes the structure that an outer peripheral surface of the case is partly flat, or the like. The case 20 accommodates the motor 30, the reduction gear 32, the brake device 33, the connection switching assembly 60, the circuit board 50, the electronic components 51, 52, and the power supply device 40.

Figure 2:
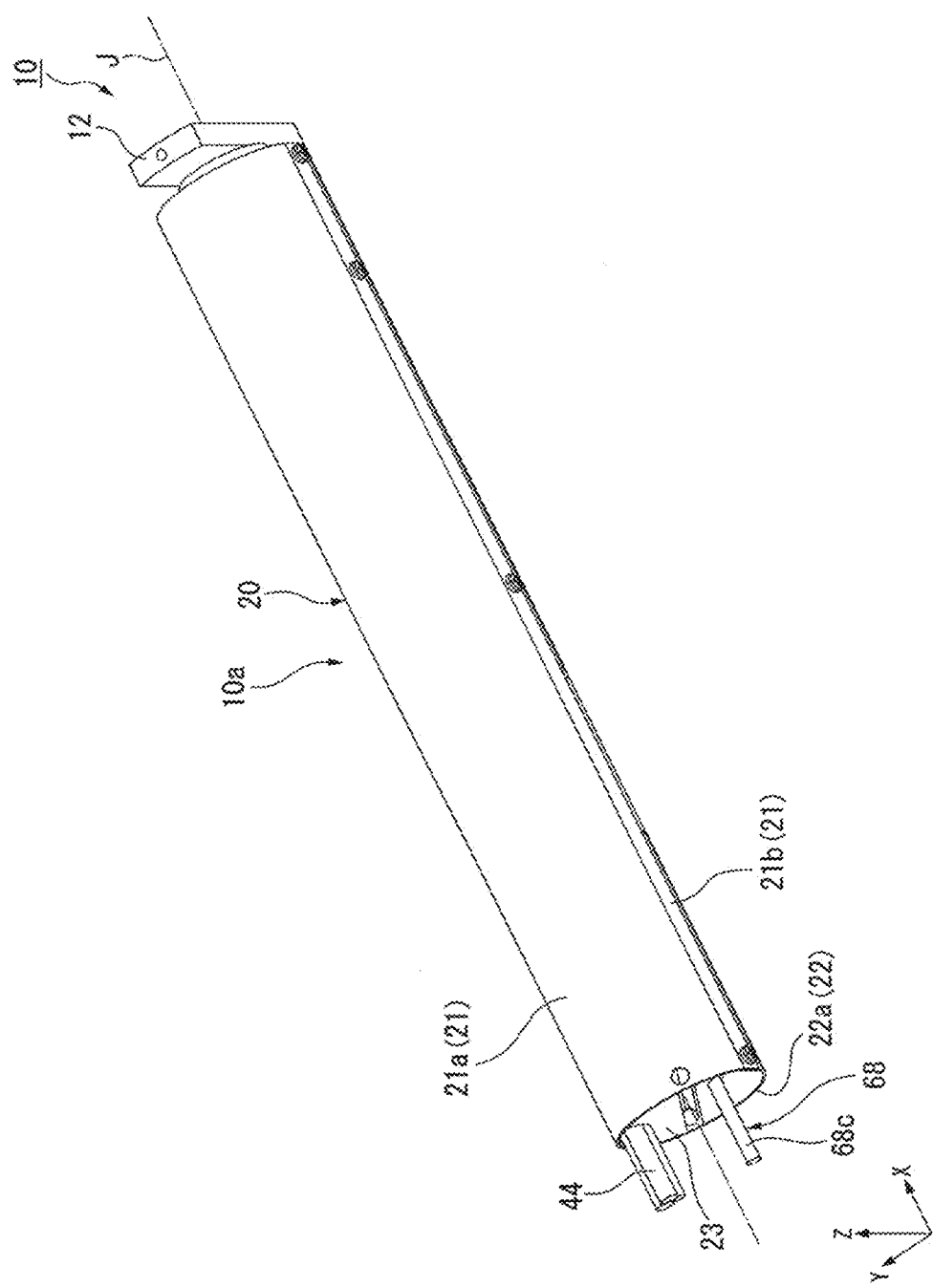
FIG. 2 is a perspective view showing a motor assembly of an example embodiment of the present disclosure.
Figure 3:
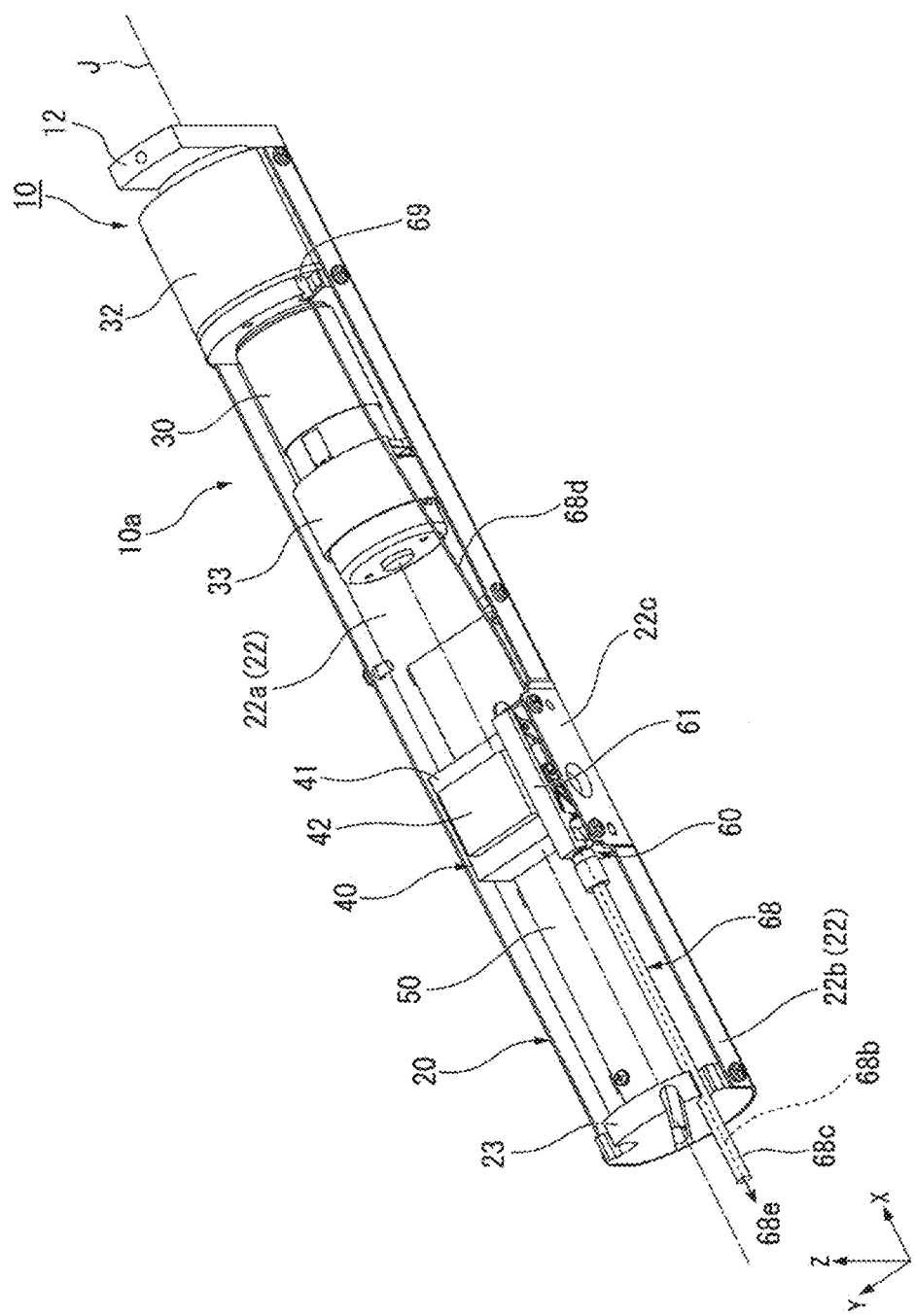
FIG. 3 is a perspective view showing a portion of an example embodiment of the present disclosure.
Figure 4:
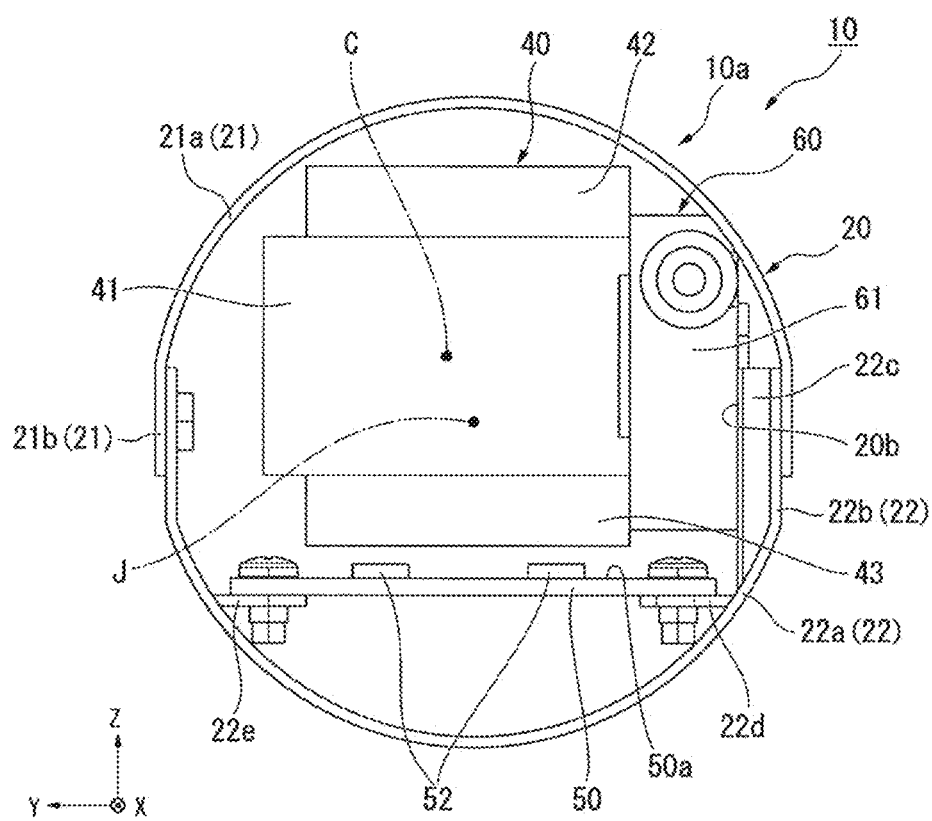
FIG. 4 is a view of a motor assembly of an example embodiment of the present disclosure as viewed from a base end side.

As shown in FIG. 2, the case 20 includes an upper case 21, a lower case 22, and a lid 23. As shown in FIG. 4, the upper case 21 has an upper curved portion 21*a* and a pair of upper flat portions 21*b*. The upper curved portion 21*a* is a plate-shaped member that extends in the axial direction X and curves in the circumferential direction. The upper curved portion 21*a* has a shape of a semicircular arc curved upward as viewed in the axial direction X. The pair of upper flat portions 21*b* are flat-shaped portions extending toward the lower side from both ends of the upper curved portion 21*a* in the circumferential direction, that is, lower ends of the upper curved portion 21*a* in the present example embodiment. As shown in FIG. 2, the upper flat portions 21*b* extend in the axial direction X from one end on the base end side to the other end on the tip end side of the upper curved portion 21*a*. Note that FIG. 3 omits the upper case 21.

As shown in FIG. 4, the lower case 22 has a lower curved portion 22*a* and a pair of lower flat portions 22*b*. The lower curved portion 22*a* is a plate-shaped member that extends in the axial direction X and curves in the circumferential direction. The lower curved portion 22*a* has a shape of a semicircular arc curved downward as viewed in the axial direction X. The pair of lower flat portions 22*b* are flat-shaped portions extending toward the upper side from both ends of the lower curved portion 22*a* in the circumferential direction, that is, upper ends of the lower curved portion 22*a* in the present example embodiment. As shown in FIG. 3, the lower flat portions 22*b* extend in the axial direction X from one end on the base end side to the other end on the tip end side of the lower curved portion 22*a*. One of the lower flat portions 22*b* has a projecting flat portion 22*c* disposed so as to project radially inwardly from the other portions of the lower flat portion 22*b*. In the present example embodiment, the projecting flat portion 22*c* is disposed on the rear side of the other portions of the lower flat portion 22*b*.

As shown in FIG. 4, the lower case 22 has board support parts 22*d*, 22*e*. Each of the board support parts 22*d*, 22*e* is a plate-shaped member that protrudes along the front-rear direction Y toward the inside of the case 20 from a radially inside surface of the lower curved portion 22*a*. The board support part 22*d* is disposed on the radially inside surface of the lower curved portion 22*a* at a position on the front side of the central axis J. The board support part 22*e* is disposed on the radially inside surface of the lower curved portion 22*a* at a position on the rear side of the central axis J. A plurality of the board support parts 22*d* and a plurality of the board support parts 22*e* are arranged in the axial direction X, for example. The plurality of board support parts 22*d* and the plurality of board support parts 22*e* are disposed to face each other in the front-rear direction Y with gaps therebetween. In the present example embodiment, each of the board support parts 22*d*, 22*e* is configured by cutting and raising part of the lower curved portion 22*a*.

Each of the upper flat portions 21*b* and corresponding one of the lower flat portions 22*b* are overlapped in the radial direction and are screwed together. Thereby, the upper case 21 and the lower case 22 are fixed together, which configures a cylindrical part having a cylindrical shape and having openings on both sides in the axial direction X. The upper flat portions 21*b* are disposed radially outwardly from the lower flat portions 22*b*, respectively. The radially inside surface of each of the lower flat portions 22*b* is a flat surface that forms part of the inside surface of the case 20. The inside surface of the case 20 has a flat part 20*b* including one of the radially inside surfaces of the lower flat portions 22*b*.

As shown in FIG. 3, the lid 23 is a disk-shaped member. The lid 23 is disposed inside the cylindrical part, which is formed by the upper case 21 and the lower case 22, at one end on the base end side thereof. The lid 23 closes one of the openings of the cylindrical part on the base end side. The lid 23 is screwed to an inside surface of the lower case 22. As shown in FIG. 1, the lid 23 is fixed to the fixing member Wa.

The motor 30 is disposed inside the case 20 at a position on the tip end side. The motor 30 has a motor shaft 31. The motor shaft 31 extends in the axial direction X centered on the central axis J, for example. The motor shaft 31 is connected to the reduction gear 32. An end on the tip end side of the motor 30 is fixed to an end on the base end side of the reduction gear 32. In the present example embodiment, the motor 30 is disposed radially inwardly away from the inside surface of the case 20.

The reduction gear 32 is disposed inside the case 20 at an end on the tip end side thereof. The reduction gear 32 closes the other one of the openings of the cylindrical part, which is formed by the upper case 21 and the lower case 22, on the tip end side. The reduction gear 32 is fixed to the inside surface of the case 20. The reduction gear 32 is connected with the output shaft 34. The motor shaft 31 is joined to the output shaft 34 through the reduction gear 32. The rotation of the motor shaft 31 is decelerated through the reduction gear 32 and transmitted to the output shaft 34. Thus, the motor 30 rotates the output shaft 34 through the motor shaft 31.

The brake device 33 is fixed to an end on the base end side of the motor 30. In the present example embodiment, the brake device 33 is disposed radially inwardly away from the inside surface of the case 20. The brake device 33 brakes the rotation of the motor 30.

In the present example embodiment, the motor 30 is not directly fixed to the case 20, but is fixed to the case 20 through the reduction gear 32. Further, the brake device 33 is not directly fixed to the case 20, but is fixed to the case 20 through the motor 30 and the reduction gear 32. Therefore, it is easy to maintain the relative positional relationship between the motor 30, the reduction gear 32, and the brake device 33, even in the case where the case 20 is deformed, for example.

Figure 5:
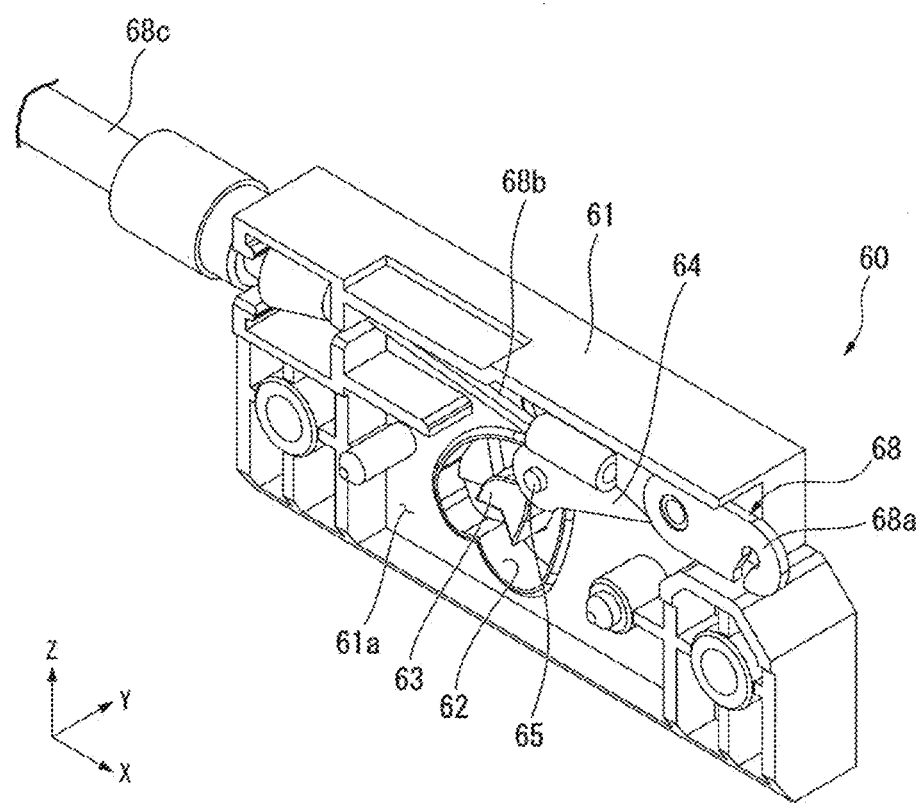
FIG. 5 is a perspective view showing a portion of a connection switching assembly of an example embodiment of the present disclosure.

As shown in FIG. 3, the connection switching assembly 60 switches between a connected state in which the output shaft 34 and the motor shaft 31 are connected to each other and a disconnected state in which the output shaft 34 and the motor shaft 31 are disconnected from each other. As shown in FIGS. 3 and 5, the connection switching assembly 60 includes a housing 61, an operation unit 68, a switching shaft 69, a link 64, and a lock pin 65.

As shown in FIG. 5, the housing 61 has a shape of a bottomed rectangular box having an opening toward the front side. As shown in FIG. 4, the housing 61 is fixed to the flat part 20b. This ensures that the housing 61 is stably and firmly fixed to the case 20. More specifically, the housing 61 is screwed to a radially inside surface of the projecting flat portion 22c of the flat part 20b.

Figure 6:
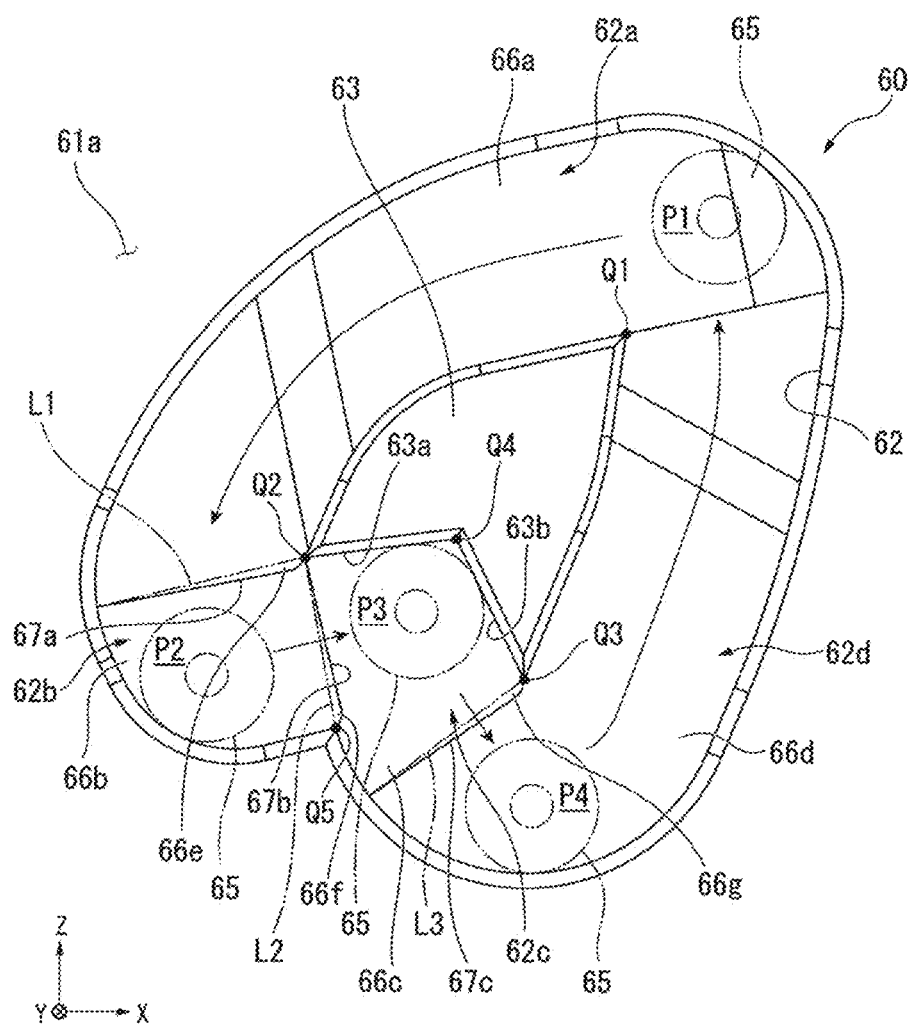
FIG. 6 is a front view of a portion of a connection switching assembly of an example embodiment of the present disclosure.

As shown in FIG. 5, the housing 61 has a recess 62 and a cam 63. The recess 62 is recessed toward the rear side from an inside surface 61a that is one of the inside surfaces of the housing 61 and faces the front side. The cam 63 protrudes toward the front side from a bottom surface of the recess 62 at a center thereof. With this configuration, the recess 62 has an annular shape surrounding the cam 63. In the following description, an inner edge side of the annular-shaped recess 62 is simply referred to as an "inner edge side", and an outer edge side of the annular-shaped recess 62 is simply referred to as an "outer edge side". As shown in FIG. 6, the recess 62 has a substantially heart-shape as viewed in the front-rear direction Y. A side surface on the outer edge side of the recess 62 has an apex Q5 projecting toward the inner edge side.

The recess 62 has a first portion 62a, a second portion 62b, a third portion 62c, and a fourth portion 62d. The first portion 62a has a curved shape extending diagonally downward toward the base end side from an end on the tip end side of the first portion 62a. The end on the tip end side of the first portion 62a is an upper end of the recess 62. The first portion 62a has a shape of a substantially arc that is projected diagonally upward toward the base end side. A first bottom 66a, which is the bottom of the first portion 62a, changes its position in the front-rear direction Y toward the front side from the end on the tip end side to the other end on the base end side of the first portion 62a.

The second portion 62b is connected to a lower part of the end on the base end side of the first portion 62a. The position in the front-rear direction Y of a second bottom 66b, which is the bottom of the second portion 62b, is situated on the rear side from the end on the base end side of the first bottom 66a. This configuration provides a first step portion 67a at the connection between the first bottom 66a and the second bottom 66b.

The third portion 62c is connected to the tip end side of the second portion 62b. The position in the front-rear direction Y of a third bottom 66c, which is the bottom of the third portion 62c, is situated on the rear side from the second bottom 66b. This configuration provides a second step portion 67b at the connection between the second bottom 66b and the third bottom 66c. The apex Q5 of the recess 62 is an endpoint on the outer edge side of the connection between the second portion 62b and the third portion 62c.

The fourth portion 62d is connected to a diagonally lower portion on the tip end side of the third portion 62c. The fourth portion 62d extends upward slightly diagonally toward the tip end side from the lower end of the fourth portion 62d. The lower end of the fourth portion 62d is the lower end of the recess 62. The upper end of the fourth portion 62d is connected to the end on the tip end side of the first portion 62a. The position in the front-rear direction Y of the lower end of a fourth bottom 66d, which is the bottom of the fourth portion 62d, is situated on the rear side from the third bottom 66c. This configuration provides a third step portion 67c at the connection between the third bottom 66c and the fourth bottom 66d. The fourth bottom 66d changes its position in the front-rear direction Y toward the front side from the lower end to the upper end of the fourth bottom 66d. The position in the front-rear direction Y of the upper end of the fourth bottom 66d, which is connected to the end on the tip end side of the first bottom 66a, is the same as the position of the end on the tip end side of the first bottom 66a.

As viewed in the front-rear direction Y, the cam 63 has a substantially heart shape with apexes Q1, Q2, Q3 and a concave apex Q4. As viewed in the front-rear direction Y, the concave apex Q4 is situated between the apex Q2 and the apex Q3 along the outer periphery of the cam 63. A wall surface of the cam 63 connecting the apex Q1 and the apex Q2 constitutes a side wall on the inner edge side of the first portion 62a. A wall surface 63a of the cam 63 connecting the apex Q2 and the concave apex Q4 constitutes part of a side wall on the inner edge side of the third portion 62c. A wall surface 63b of the cam 63 connecting the concave apex Q4 and the apex Q3 constitutes part of the side wall on the inner edge side of the third portion 62c. A wall surface of the cam 63 connecting the apex Q3 and the apex Q1 constitutes a side wall on the inner edge side of the fourth portion 62d.

The apex Q2 is an endpoint on the inner edge side of the connection between the first portion 62a and the second portion 62b, and also an endpoint on the inner edge side of the connection between the second portion 62b and the third portion 62c. That is, the first portion 62a, the second portion 62b, and the third portion 62c are connected to one another at the apex Q2. The apex Q3 is an endpoint on the inner edge side of the connection between the third portion 62c and the fourth portion 62d.

As viewed in the front-rear direction Y, the first bottom 66a has a first projecting portion 66e projecting toward the second portion 62b from a first imaginary line L1, that is, projecting toward the lower side. The first imaginary line L1 is a line connecting the apex Q2 and an endpoint on the outer edge side of the connection between the first portion 62a and the second portion 62b. The projecting amount of the first projecting portion 66e increases relatively largely toward the outer edge side from the apex Q2, and then decreases relatively gently toward an endpoint on the outer edge side of the first imaginary line L1. A step surface of the first step portion 67a that is parallel to the front-rear direction Y is a side surface of the first projecting portion 66e on the second bottom 66b side.

As viewed in the front-rear direction Y, the second bottom 66b has a second projecting portion 66f projecting toward the third portion 62c from a second imaginary line L2, that is, projecting toward the tip end side. The second imaginary line L2 is a line connecting the apex Q2 and the apex Q5. The projecting amount of the second projecting portion 66f increases relatively largely toward the inner edge side from the apex Q5, and then decreases relatively gently toward the apex Q2. A step surface of the second step portion 67b that is parallel to the front-rear direction Y is a side surface of the second projecting portion 66f on the third bottom 66c side.

As viewed in the front-rear direction Y, the third bottom 66c has a third projecting portion 66g projecting toward the fourth portion 62d from a third imaginary line L3, that is, projecting diagonally downward on the tip end side. The third imaginary line L3 is a line connecting the apex Q3 and an endpoint on the outer edge side of the connection between the third portion 62c and the fourth portion 62d. The projecting amount of the third projecting portion 66g increases relatively largely toward the outer edge side from the apex Q3, and then decreases relatively gently toward an endpoint of the third imaginary line L3 on the outer edge side. A step surface of the third step portion 67c that is parallel to the front-rear direction Y is a side surface of the third projecting portion 66g on the fourth bottom 66d side.

As shown in FIGS. 3 and 5, the operation unit 68 has a hook part 68a, an operation wire 68b, a covering tube 68c, and a connection wire 68d. As shown in FIG. 5, the hook part 68a is a plate-shaped member extending in the axial direction X. An end on the base end side of the hook part 68a is inserted into the housing 61. The hook part 68a is supported by the housing 61 in a movable manner in the axial direction X. An end on the tip end side of the hook part 68a is connected with an end on the base end side of the connection wire 68d.

The operation wire 68b is connected to an end on the base end side of the hook part 68a. The operation wire 68b extends toward the base end side from the hook part 68a, and is pulled out of the case 20 as shown in FIG. 3. The operation wire 68b pulled out of the case 20 is pulled downward from the drive device 10 as shown in FIG. 1, and constitutes a pull switch 68e.

As shown in FIG. 3, the covering tube 68c is connected to the housing 61. The covering tube 68c extends toward the base end side from the housing 61 and is pulled out of the case 20. The operation wire 68b is passed through the covering tube 68c. The connection wire 68d extends toward the tip end side from the hook part 68a and is connected to the switching shaft 69.

The switching shaft 69 is attached to the reduction gear 32. Although not shown, the switching shaft 69 is fixed to part of a connecting component that connects the motor shaft 31 and the output shaft 34 in the reduction gear 32. The switching shaft 69 is movable in the axial direction X. Along with the movement of the switching shaft 69 in the axial direction X, the connecting component fixed to the switching shaft 69 also moves in the axial direction X. An elastic force is applied to the hook part 68a, the operation wire 68b, the connection wire 68d and the switching shaft 69 toward the tip end side by an elastic member (not shown).

As shown in FIG. 5, the link 64 is connected to the end on the base end side of the hook part 68a in a rotatable manner around an axis parallel to the front-rear direction Y. The lock pin 65 is connected to an end on the base end side of the link 64. The lock pin 65 is disposed in the recess 62. The lock pin 65 moves within the annular-shaped recess 62 in accordance with operation of the operation unit 68.

When an operator pulls the pull switch 68e, the operation wire 68b is pulled toward the base end side, and the switching shaft 69 is moved toward the base end side through the hook part 68a and the connection wire 68d. Thereby, the connecting component fixed to the switching shaft 69 moves toward the base end side, and the connection between the output shaft 34 and the motor shaft 31 is released. As a result, the output shaft 34 and the motor shaft 31 are placed in a disconnected state. At this time, the lock pin 65 moves from a first position P1 to a second position P2, as shown by the two-dot chain lines in FIG. 6. The first position P1 is within an upper end portion of the first portion 62a, and the second position P2 is within the second portion 62b.

When an operator releases the pulling force of the pull switch 68e, the operation wire 68b, the hook part 68a, the connection wire 68d and the switching shaft 69 move toward the tip end side by a restoring force of the elastic member (not shown). At this time, the lock pin 65 moves from the second position P2 to a third position P3. The third position P3 is within the third portion 62c. At the third position P3, the lock pin 65 comes into contact with the wall surface 63b of the cam 63, which prevents movement of the lock pin 65 toward the tip end side. As a result, movement of the operation wire 68b, the hook part 68a, the connection wire 68d, and the switching shaft 69 toward the tip end side is prevented, which maintains the disconnected state where the connection between the output shaft 34 and the motor shaft 31 is released. In the disconnected state, the output shaft 34 is freely rotatable regardless of the state of the motor shaft 31, so that the operator can manually raise and lower the shutter 80.

When the operator further pulls the pull switch 68e in the disconnected state, the lock pin 65 moves toward the base end side from the third position P3. However, since the second step portion 67b is provided, the lock pin 65 is prevented from returning to the second portion 62b, and moves along the step surface of the second step portion 67b and the side surface on the outer edge side of the recess 62. Then, the lock pin 65 moves to a fourth position P4. The fourth position P4 is within a lower end portion of the fourth portion 62d. When the operator releases the pulling force of the pull switch 68e in this state, the lock pin 65 returns to the first position P1 along the fourth portion 62d. Thereby, each of the switching shaft 69 and the connecting component returns to the position for connecting the output shaft 34 to the motor shaft 31, and the output shaft 34 and the motor shaft 31 are placed in the connected state again.

When moving from the second position P2 to the third position P3, the lock pin 65 is in contact with the step surface of the first step portion 67a. Therefore, the lower end of the first bottom 66a having the step surface of the first step portion 67a gradually wears away with operation of the operation unit 68. Here, for example, if the first bottom 66a gradually wears away and an endpoint on the inner edge side of the step surface of the first step portion 67a is closer to the first portion 62a than the apex Q2 is, the apex Q2 may inhibit the movement of the lock pin 65 on the way from the second position P2 to the third position P3. This inhibits normal operation of the connection switching assembly 60.

On the other hand, according to the present example embodiment, the first bottom 66a is provided with the first projecting portion 66e located closer to the second portion 62b than the first imaginary line L1 having the apex Q2 as the endpoint on the inner edge side. This configuration prevents the endpoint on the inner edge side of the step surface of the first step portion 67a from being closer to the first portion 62a than the apex Q2 until the first projecting portion 66e is completely worn out. Accordingly, the inhibition of the movement of the lock pin 65 can be suppressed as the endpoint on the inner edge side of the step surface of the first step portion 67a is prevented from being closer to the first portion 62a than the apex Q2. Therefore, the present example embodiment can suppress the inhibition against normal operation of the connection switching assembly 60.

In the same manner as the first projecting portion 66e described above, the second projecting portion 66f can suppress the inhibition against the movement of the lock pin 65 from the third position P3 to the fourth position P4. In addition, in the same manner as the first projecting portion 66e described above, the third projecting portion 66g can suppress the inhibition against the movement of the lock pin 65 from the fourth position P4 to the first position P1. Therefore, the inhibition against normal operation of the connection switching assembly 60 can be suppressed.

As shown in FIG. 3, the circuit board 50 is disposed inside the case 20 on the base end side. The circuit board 50 has a shape of a rectangular plate extending in the axial direction X. A substrate surface 50*a* of the circuit board 50 lies at right angles to the vertical direction Z. The substrate surface 50*a* is the upper surface of the circuit board 50. Printed wiring (not shown) is provided on the substrate surface 50*a*.

As shown in FIG. 4, the circuit board 50 is disposed on the upper surfaces of the board support parts 22*d*, 22*e*. In the present example embodiment, the circuit board 50 is screwed to one of the board support parts 22*d* disposed closest to the tip end side, and screwed to one of the board support parts 22*e* disposed closest to the base end side. That is, the circuit board 50 is screwed to the case 20 at diagonally arranged two portions. The circuit board 50 is disposed at the lower side of a center of the case 20. In the present example embodiment, the center of the case 20 coincides with the central axis J. Although not shown, the circuit board 50 is electrically connected to the motor 30.

The power supply device 40 supplies electric power to the motor 30 and the circuit board 50. The power supply device 40 is connected to an external power source (not shown) through a power supply cable 44 shown in FIG. 2. The power supply device 40 is, for example, a transformer configured to convert a voltage of electric power supplied from the external power source. As shown in FIG. 1, the power supply device 40 is disposed inside the case 20 closer to the base end side.

The substrate surface 50*a* and the power supply device 40 are disposed to face each other in the vertical direction Z that is orthogonal to the axial direction X. Therefore, the size of the case 20 accommodating the circuit board 50 and the power supply device 40 can be reduced in the axial direction X, as compared with the structure in which the circuit board 50 and the power supply device 40 are arranged side by side in the axial direction X. In other words, there is no need to change the size of the case 20 in the axial direction X even when the circuit board 50 is enlarged in the axial direction X by the amount equivalent to the space for the power supply device 40 in the case of arranging the circuit board 50 and the power supply device 40 side by side in the axial direction X. That is, the circuit board 50 can be enlarged in the axial direction X without enlarging the case 20 in the axial direction X. Therefore, the present example embodiment can suppress enlargement of the motor assembly 10*a* even when the circuit board 50 is enlarged.

In the present example embodiment, the substrate surface 50*a* and the power supply device 40 face each other in the vertical direction Z with a gap therebetween, as shown in FIG. 4. The power supply device 40 is fixed to the case 20 through the housing 61. In the present example embodiment, the housing 61 serves as a spacer fixed to an inner side surface of the case 20. That is, the motor assembly 10*a* includes the housing 61 as a spacer.

For example, consider that the power supply device 40 is directly fixed to the case 20. In such a case, if the case 20 has a cylindrical shape as in the present example embodiment, positioning of the power supply device 40 inside the case 20 may be limited. Specifically, for example, when the power supply device 40 is directly fixed to the flat part 20*b*, the upper end of the power supply device 40 interferes with the upper curved portion 21*a*, which necessitates the power supply device 40 being located lower than the position thereof shown in FIG. 4. In this case, as the position of the power supply device 40 is lowered, the position of the circuit board 50 also needs to be lowered. However, since the size in the front-rear direction Y of the case 20 becomes smaller toward the lower side, it is necessary to reduce the size of the circuit board 50 in the front-rear direction Y when the circuit board 50 is disposed lower than the position thereof shown in FIG. 4. Therefore, there is a problem that an area for mounting the circuit board 50 is reduced.

On the other hand, according to the present example embodiment, the power supply device 40 is fixed to the case 20 through the housing 61 that serves as a spacer, thus the position of the power supply device 40 can be easily adjusted inside the case 20. Specifically, the position of the power supply device 40 in the front-rear direction Y can be disposed closer to the center of the case 20 because of the housing 61. The upper curved portion 21*a* is positioned higher in the vertical direction Z as it approaches the center of the case 20, and thus the power supply device 40 can be disposed at a higher position by being disposed closer to the center of the case 20. This allows the circuit board 50 to be disposed at a higher position inside the case 20, which enables the circuit board 50 to have a larger size in the front-rear direction Y. Therefore, the power supply device 40 is fixed to the case 20 through the housing 61 according to the present example embodiment, which ensures a larger area for mounting the circuit board 50 in the present example embodiment.

In the present example embodiment, the power supply device 40 is fixed to the lower case 22 through the housing 61. Further, the circuit board 50 is also fixed to the lower case 22 as described above. That is, both the power supply device 40 and the circuit board 50 are fixed to the lower case 22. As the power supply device 40 and the circuit board 50 are electrically connected to each other, the motor assembly 10*a* can be assembled easily by fixing the power supply device 40 and the circuit board 50 to the same lower case 22.

The housing 61 serving as a spacer in the present example embodiment is part of the connection switching assembly 60. That is, the spacer includes at least part of the connection switching assembly 60. In this manner, since at least part of the connection switching assembly 60 is used as a spacer in the present example embodiment, it is not necessary to additionally provide a spacer. This can suppress increase in the number of components of the motor assembly 10*a*, which can suppress increase in time and effort for assembly and the manufacturing cost of the motor assembly 10*a*.

The power supply device 40 is fixed to a surface on the rear side of the housing 61. The power supply device 40 and the housing 61 are arranged side by side in the front-rear direction Y. As described above, the predetermined direction in which the substrate surface 50*a* and the power supply device 40 face each other is the vertical direction Z in the present example embodiment. That is, the predetermined direction in which the substrate surface 50*a* and the power supply device 40 face each other is a direction intersecting the direction in which the power supply device 40 and the housing 61 are arranged.

For example, in the case where the predetermined direction in which the substrate surface 50*a* and the power supply device 40 face each other is parallel to the direction in which the power supply device 40 and the housing 61 are arranged, the power supply device 40, the circuit board 50, and the housing 61 are arranged in the same direction. In this case, it is necessary to closely arrange the power supply device 40 and the circuit board 50 so that the housing 61 can be arranged next to them. Therefore, for example, the circuit board 50 needs to be disposed at a lower position, which requires the circuit board 50 to be reduced in size in the front-rear direction Y. This may reduce the area for mounting the circuit board 50.

On the other hand, according to the present example embodiment, the power supply device 40 and the housing 61 can be arranged side by side in a direction different from the direction in which the power supply device 40 and the circuit board 50 are arranged. This increases the degree of freedom in the arrangement of the power supply device 40 and the circuit board 50 in the predetermined direction, and suppresses reduction in the area for mounting the circuit board 50. In addition, the space in the case can be effectively used in the direction intersecting the predetermined direction. Specifically, in the present example embodiment, the space in the front-rear direction Y in the case 20 can be effectively used as a space for disposing the housing 61. The above-described effect can be magnified particularly when the predetermined direction in which the substrate surface 50a and the power supply device 40 face each other is orthogonal to the direction in which the power supply device 40 and the housing 61 are arranged, as in the present example embodiment.

As viewed in the axial direction X, a center C of the power supply device 40 is disposed higher than the center of the case 20, that is, the central axis J in the present example embodiment. Therefore, the circuit board 50 can be easily disposed closer to the center of the case 20 in the vertical direction Z, and thus the area for mounting the circuit board 50 can be secured easily. Further, the circuit board 50 is disposed lower than the center of the case 20, which can increase a distance between the upper surface of the circuit board 50, that is, the substrate surface 50a and the upper end of the case 20. With this configuration, an electronic component having a large size in the vertical direction Z can be disposed easily on the substrate surface 50a.

The power supply device 40 and the housing 61 are screwed together to the case 20. Therefore, the power supply device 40 and the housing 61 can be simultaneously fixed to the case 20, which can simplify the assembly of the motor assembly 10a.

The power supply device 40 includes a main body 41, an upper protrusion 42, and a lower protrusion 43. The main body 41, the upper protrusion 42, and the lower protrusion 43 are rectangular solid parts. The upper protrusion 42 is connected to the upper end of the main body 41. The lower protrusion 43 is connected to the lower end of the main body 41. The size of the upper protrusion 42 in the front-rear direction Y is smaller than the size of the main body 41 in the front-rear direction Y. Therefore, in the case 20 having a cylindrical shape, it is easy to dispose the upper protrusion 42 higher than the main body 41. Thereby, the power supply device 40 can be easily disposed at a higher position. The size of the lower protrusion 43 in the front-rear direction Y is smaller than the size of the main body 41 in the front-rear direction Y. As shown in FIG. 3, the size of the upper protrusion 42 in the axial direction X is smaller than the size of the main body 41 in the axial direction X. Although not shown in the figure, the size of the lower protrusion 43 in the axial direction X is smaller than the size of the main body 41 in the axial direction X.

As shown in FIG. 1, the plurality of electronic components 51, 52 are attached to the circuit board 50. The electronic component 51 is attached to the substrate surface 50a at a position different from the power supply device 40 in the axial direction X. In the present example embodiment, the electronic component 51 is attached to the substrate surface 50a on the tip end side of the power supply device 40. The electronic component 51 is a component having a relatively large size in the vertical direction Z. The electronic component 51 overlaps the power supply device 40 in the axial direction X. That is, at least part of the plurality of electronic components is attached to the substrate surface 50a at a position different from the position of the power supply device 40 in the axial direction X, and overlaps the power supply device 40 in the axial direction X. Therefore, a component having a relatively large size in the vertical direction Z, such as the electronic component 51, can be mounted on the circuit board 50.

For example, the electronic component 51 is a component for wireless communication. The electronic component 51 is, for example, an electronic component that allows the motor assembly 10a to receive a signal transmitted from the outside. This enables remote control of the motor assembly 10a. The substrate surface 50a has a relatively large space for installing components for wireless communication. Therefore, the above described effect that can suppress the increase in size of the motor assembly 10a while enlarging the circuit board 50 is largely exerted in the case where the components for wireless communication are mounted on the circuit board 50.

The electronic component 52 is disposed on the substrate surface 50a at a position facing the power supply device 40. That is, at least part of the plurality of electronic components is disposed on the substrate surface 50a at a position facing the power supply device 40. Therefore, the space on the substrate surface 50a can be effectively used. The electronic component 52 is a component whose size in the vertical direction Z is relatively small as compared to that of the electronic component 51. In the case where the sizes of the electronic components mounted on the circuit board 50 vary in the vertical direction Z as in the present example embodiment, electronic components having a relatively small size in the vertical direction Z are disposed on the substrate surface 50a at a position facing the power supply device 40, and electronic components having a relatively large size in the vertical direction Z are disposed on the substrate surface 50a at a position different from that of the power supply device 40 in the axial direction X, so that a larger number of electronic components can be suitably disposed on the circuit board 50.

The rotary cylinder 11 extends in the axial direction X, and has a cylindrical shape disposed radially outwardly from the case 20. The rotary cylinder 11 has, for example, the central axis J as a center. The rotary cylinder 11 extends from the end of the motor assembly 10a on the base end side toward the tip end side (+X side) beyond the other end on the tip end side of the motor assembly 10a. One end of the rotary cylinder 11 on one side in the axial direction X (−X side) is joined to the case 20 through the bearing 70. Although not shown in the figure, the other end of the rotary cylinder 11 on the other side in the axial direction X (+X side) is rotatably supported by the wall. Thus, the rotary cylinder 11 is supported at both ends thereof in the axial direction X in a rotatable manner around the central axis J.

The rotary cylinder 11 is joined to the output shaft 34 through the connection member 12. As shown in FIG. 2, the connection member 12 is a plate-like member having a substantially rectangular shape and fixed to the output shaft 34. As shown in FIG. 1, the connection member 12 is fixed to the inner circumferential surface of the rotary cylinder 11. Thus, when the output shaft 34 rotates, the rotary cylinder 11 also rotates through the connection member 12. That is, the rotary cylinder 11 rotates according to the rotation of the output shaft 34. The drive device 10 of the present example embodiment equipped with such a rotary cylinder 11 can be used as a drive device for a shutter device as in the present example embodiment, a drive device for a transport roller, or the like.

Specifically, in the drive device 10 used for the shutter device 1 of the present example embodiment, the rotary cylinder 11 is rotated to wind the shutter 80 around the rotary cylinder 11, so that the shutter 80 can be raised. Further, the rotary cylinder 11 is rotated in the reverse direction to unwind the shutter 80 that has been wound around the rotary cylinder 11, so that the shutter 80 can be lowered.

In the case where the motor assembly 10a is provided in the drive device 10 in which the rotary cylinder 11 is provided as in the present example embodiment, the space of the case 20 can be enlarged by forming the case 20 of the motor assembly 10a in a cylindrical shape as compared to the case 20 formed in a rectangular tubular shape. That is, a motor assembly 10a suitable for the drive device 10 including the rotary cylinder 11 can be provided by forming the case 20 in a cylindrical shape.

In the shutter device 1, for example, other devices are disposed inside the rotary cylinder 11 avoiding the position where the motor assembly 10a is accommodated. Therefore, enlargement of the motor assembly 10a in the axial direction X causes a problem that the other devices cannot be disposed. In view of this, the above described effect that can suppress enlargement of the motor assembly 10a is favorable particularly to the drive device 10 used for the shutter device 1.

In addition, since enlargement of the motor assembly 10a can be suppressed, it is possible to manufacture a shutter device with a new function by replacing only the circuit board in the existing shutter device, for example, even in the case where a circuit board is enlarged by adding a new function to the shutter device. This facilitates manufacture of a shutter device added with a new function.

The other devices provided in the shutter device 1 include, for example, a coil spring and the like that applies an elastic force to the rotary cylinder 11 in a direction in which the shutter 80 is wound among the rotation directions around the central axis J. The rotation torque necessary for rotating the rotary cylinder 11 is maximized in the state in which the shutter 80 is fully unwound, that is, the shutter 80 is closed, and is minimized in the state in which the shutter 80 is fully wound, that is, the shutter 80 is opened. When the shutter 80 is closed, a relatively large elastic force is applied to the rotary cylinder 11 by the coil spring. The elastic force applied to the rotary cylinder 11 decreases as the shutter 80 opens. In this manner, the coil spring can assist the rotation of the rotary cylinder 11 by the motor assembly 10a. Therefore, the rotation torque of the motor assembly 10a can be reduced, which contributes to miniaturization of the motor 30. Further, the rotary cylinder 11 can be rotated with an appropriate rotation torque according to the open/close state of the shutter 80, thereby stabilizing the upward and downward movement of the shutter 80.

The present disclosure is not limited to the above-described example embodiment, and other configurations may be adopted. The circuit board 50 and the power supply device 40 may be in contact with and face each other. Moreover, as long as part of the power supply device 40 faces the substrate surface 50a, the other part of the power supply device 40 may not face the substrate surface 50a. Further, the predetermined direction in which the substrate surface 50a and the power supply device 40 face each other is not particularly limited as long as it is orthogonal to the axial direction X, and may be a direction other than the vertical direction Z.

Moreover, the spacer is part of the connection switching assembly 60 in the above example embodiment, but is not limited thereto. The spacer may include another portion in addition to part of the connection switching assembly 60, or may not include the connection switching assembly 60. In addition, the direction in which the power supply device 40 and the spacer are arranged may be parallel to the direction in which the substrate surface 50a and the power supply device 40 face each other. Furthermore, the spacer may not be provided. Moreover, the case 20 is not limited to a cylindrical shape, and may have an elliptic tubular shape or a rectangular tubular shape. The center of the case 20 may not coincide with the central axis J.

Further, the application of the motor assembly 10a according to the above example embodiment is not limited, and the motor assembly 10a may be mounted on any device in addition to the drive device 10 for the shutter device 1. Moreover, the drive device 10 of the above example embodiment may be mounted on any device in addition to the shutter device 1. Moreover, each structure mentioned above can be combined suitably within the range that they are not mutually inconsistent.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor assembly comprising:
   an output shaft disposed along a central axis extending in one direction;
   a motor that rotates the output shaft;
   a circuit board electrically connected to the motor;
   a power supply that supplies supply power to the motor and the circuit board;
   a case having a tubular shape that extends in an axial direction and accommodates the motor, the circuit board, and the power supply; and
   a spacer fixed to an inside surface of the case such that the power supply is fixed to the case through the spacer; wherein
   a substrate surface of the circuit board and the power supply are disposed to face each other in a predetermined direction that is orthogonal or substantially orthogonal to the axial direction;
   the motor includes a motor shaft connected to the output shaft, and rotates the output shaft through the motor shaft; and
   the spacer includes at least a portion of a connection switching assembly that switches between a connected state in which the output shaft and the motor shaft are connected to other and a disconnected state in which the output shaft and the motor shaft are disconnected.

2. The motor assembly according to claim 1, wherein the case has a cylindrical shape.

3. The motor assembly according to claim 1, wherein the predetermined direction is a direction that intersects a direction in which the power supply and the spacer are arranged side by side.

4. The motor assembly according to claim 3, wherein
   a center of the power supply is disposed on one side in the predetermined direction with respect to a center of the case; and
   the circuit board is disposed on the other side in the predetermined direction with respect to the center of the case, as viewed in the axial direction.

5. The motor assembly according to claim 1, wherein the inside surface of the case includes a flat portion, and the spacer is fixed to the flat portion.

6. The motor assembly according to claim 1, wherein the power supply and the spacer are fastened together to the case.

7. The motor assembly according to claim 1, further comprising a plurality of electronic components attached to the circuit board, wherein
- the substrate surface and the power supply face each other through a gap in the predetermined direction; and
- at least a portion of the electronic components is disposed on the substrate surface at a position to face the power supply.

8. The motor assembly according to claim 7, wherein the portion of the electronic components is attached to the substrate surface at a position different from a position of the power supply in the axial direction, and overlaps the power supply in the axial direction.

9. A drive device comprising:
- the motor assembly according to claim 1; and
- a rotary cylinder having a cylindrical shape that extends in the axial direction and disposed radially outwardly from the case; wherein
- the rotary cylinder is connected to the output shaft and is rotated according to rotation of the output shaft.

10. The drive device according to claim 9, wherein the drive device is a drive device of a shutter device.

* * * * *